US011251856B2

(12) United States Patent
Shikida et al.

(10) Patent No.: US 11,251,856 B2
(45) Date of Patent: Feb. 15, 2022

(54) CONTROL APPARATUS, RADIO COMMUNICATION METHOD, AND NON-TRANSITORY COMPUTER READABLE MEDIUM

(71) Applicant: NEC Corporation, Tokyo (JP)

(72) Inventors: Jun Shikida, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/228,832

(22) Filed: Apr. 13, 2021

(65) Prior Publication Data

US 2021/0328654 A1 Oct. 21, 2021

(30) Foreign Application Priority Data

Apr. 21, 2020 (JP) .............................. JP2020-075287

(51) Int. Cl.
*H04B 7/10* (2017.01)
*H04L 1/02* (2006.01)
*H04B 7/08* (2006.01)

(52) U.S. Cl.
CPC .................................. *H04B 7/0842* (2013.01)

(58) Field of Classification Search
CPC .................................................... H04B 7/0842
USPC .......................................................... 375/347
See application file for complete search history.

(56) References Cited

U.S. PATENT DOCUMENTS

| 7,327,800 | B2* | 2/2008 | Oprea | H04B 7/0434 370/203 |
| 7,746,943 | B2* | 6/2010 | Yamaura | H04L 25/03343 375/260 |
| 7,817,741 | B2* | 10/2010 | Hayase | H04B 7/0854 375/267 |
| 8,064,502 | B2* | 11/2011 | Sawai | H04B 17/12 375/219 |
| 8,351,544 | B2* | 1/2013 | Mondal | H04B 7/0478 375/299 |
| 8,842,764 | B2* | 9/2014 | Werner | H04B 7/0413 375/267 |

(Continued)

FOREIGN PATENT DOCUMENTS

| JP | 2013-223141 A | 10/2013 |
| JP | 2015-228664 A | 12/2015 |

*Primary Examiner* — Tanmay K Shah
(74) *Attorney, Agent, or Firm* — Sughrue Mion, PLLC

(57) ABSTRACT

A control apparatus includes a determination unit configured to determine first and second reception weight matrixes by using first and second channel matrixes between first and second radio apparatuses and the first and second terminals, a first calculation unit configured to calculate a data channel matrix of a data signal transmitted from the first radio apparatus to the first terminal by using the first channel matrix and the first reception weight matrix, a second calculation unit configured to calculate an interference channel matrix of interference to the second terminal caused by the first radio apparatus by using a third channel matrix between the first radio apparatus and the second terminal and the second reception weight matrix, and a third calculation unit configured to calculate a transmission weight matrix for transmitting a data signal so that the interference is suppressed by using the data channel matrix and the interference channel matrix.

8 Claims, 6 Drawing Sheets

(56) References Cited

U.S. PATENT DOCUMENTS

| | | | | |
|---|---|---|---|---|
| 2002/0118781 A1* | 8/2002 | Thomas | ............... | H04B 7/0848 |
| | | | | 375/347 |
| 2005/0053170 A1* | 3/2005 | Catreux | .............. | H04L 27/2608 |
| | | | | 375/267 |
| 2005/0141631 A1* | 6/2005 | Takano | ................ | H04L 1/0656 |
| | | | | 375/267 |
| 2005/0249304 A1* | 11/2005 | Takano | ................ | H04B 7/0842 |
| | | | | 375/267 |
| 2006/0068718 A1* | 3/2006 | Li | ........................ | H04B 7/0663 |
| | | | | 455/69 |
| 2007/0036205 A1* | 2/2007 | Nakamori | ............ | H04B 1/7113 |
| | | | | 375/148 |
| 2015/0139347 A1* | 5/2015 | Murch | ................ | H04B 7/0456 |
| | | | | 375/267 |

* cited by examiner

CONTROL APPARATUS, RADIO COMMUNICATION METHOD, AND NON-TRANSITORY COMPUTER READABLE MEDIUM

INCORPORATION BY REFERENCE

This application is based upon and claims the benefit of priority from Japanese patent application No. 2020-075287, filed on Apr. 21, 2020, the disclosure of which is incorporated herein in its entirety by reference.

TECHNICAL FIELD

The present disclosure relates to a control apparatus, a radio communication method, and a non-transitory computer readable medium storing a radio communication program.

BACKGROUND ART

In radio communication systems, a network configuration in which a plurality of transmission/reception points are arranged in a distributed manner and baseband signal processing functions corresponding to the respective transmission/reception points are included in a control apparatus and controlled in a centralized manner by the control apparatus has been introduced. By controlling the baseband signal processing functions in the centralized manner, the coordination among the plurality of transmission/reception points can be easily controlled, so that the effect of the arrangement of the transmission/reception points can be enhanced.

As a technique for coordinated transmission among a plurality of transmission/reception points, coordinated beamforming (CB: Coordinated Beamforming) has been studied (e.g., Japanese Unexamined Patent Application Publications No. 2013-223141 and No. 2015-228664). The coordinated beamforming is a method in which a transmission/reception point transmits, by using beamforming, data to a radio terminal with which the transmission/reception point is communicating while suppressing interference to radio terminals communicating with other transmission/reception points. By using the coordinated beamforming, it is possible to reduce interference from transmission/reception points other than the transmission/reception point with which the radio terminal is communicating, and thereby to improve the quality of communication performed by the radio terminal.

Japanese Unexamined Patent Application Publications No. 2013-223141 and No. 2015-228664 each disclose a data transmitting/receiving method using coordinated beamforming. Japanese Unexamined Patent Application Publications No. 2013-223141 and No. 2015-228664 each disclose that a base station receives information about a channel used between the radio base station and a radio terminal from the radio terminal, and transmits data to a radio terminal with which the base station is communicating with while suppressing interference to radio terminals communicating with other radio base stations by using the received information.

In coordinated beamforming, the number of channels for which each transmission/reception point intends to suppress interference is equal to the number of antennas of each of the radio terminals communicating with other transmission/reception points. However, there is a limit on the number of channels for which interference can be suppressed, and the sum total of the number of channels for which interference is suppressed and the number of data signals to be transmitted has to be equal to or less than the number of antennas of the transmission/reception point. Therefore, when the number of radio terminals communicating with other transmission/reception points or the number of antennas of the radio terminals is large, the number of channels for which interference should be suppressed increases, so that the number of data signals decreases according to the degree of that increase in the number of channels, thus making it impossible to achieve high throughput. Therefore, when the number of radio terminals communicating with other transmission/reception points or the number of antennas of the radio terminals is large, it is impossible to achieve high throughput even if the technique disclosed in Japanese Unexamined Patent Application Publications No. 2013-223141 and No. 2015-228664 are used.

SUMMARY

The present disclosure has been made to solve the above-described problem, and one of the objects thereof is to provide a control apparatus, a radio communication method, and a radio communication program capable of improving throughput.

A control apparatus according to the present disclosure is a control apparatus configured to connect to a first radio apparatus that communicates with a first radio terminal and a second radio apparatus that communicates with a second radio terminal, the control apparatus including:

a reception weight determination unit configured to determine a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;

a data channel calculation unit configured to calculate a data channel matrix corresponding to a data signal transmitted from the first radio apparatus to the first radio terminal based on the first channel matrix and the first reception weight matrix;

an interference channel calculation unit configured to calculate an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and a transmission weight calculation unit configured to calculate a transmission weight matrix based on the data channel matrix and the interference channel matrix, the transmission weight matrix being a weight matrix for transmitting a data signal from the first apparatus to the first terminal while suppressing the interference.

A radio communication method according to the present disclosure is a radio communication method performed by a control apparatus configured to connect to a first radio apparatus that communicates with a first radio terminal and a second radio apparatus that communicates with a second radio terminal, the radio communication method including:

determining a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;

calculating a data channel matrix corresponding to a data signal transmitted from the first radio apparatus to the first radio terminal based on the first channel matrix and the first reception weight matrix;

calculating an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and calculating a transmission weight matrix based on the data channel matrix and the interference channel matrix, the transmission weight matrix being a weight matrix for transmitting a data signal from the first radio apparatus to the first radio terminal while suppressing the interference.

A radio communication program according to the present disclosure is a radio communication program adapted to be executed by a control apparatus configured to connect to a first radio apparatus that communicates with a first radio terminal and a second radio apparatus that communicates with a second radio terminal, the radio communication program being adapted to cause the control apparatus to perform processes including:

determining a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;

calculating a data channel matrix corresponding to a data signal transmitted from the first radio apparatus to the first radio terminal based on the first channel matrix and the first reception weight matrix;

calculating an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and calculating a transmission weight matrix based on the data channel matrix and the interference channel matrix, the transmission weight matrix being a weight matrix for transmitting a data signal from the first radio apparatus to the first radio terminal while suppressing the interference.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Figure 1:
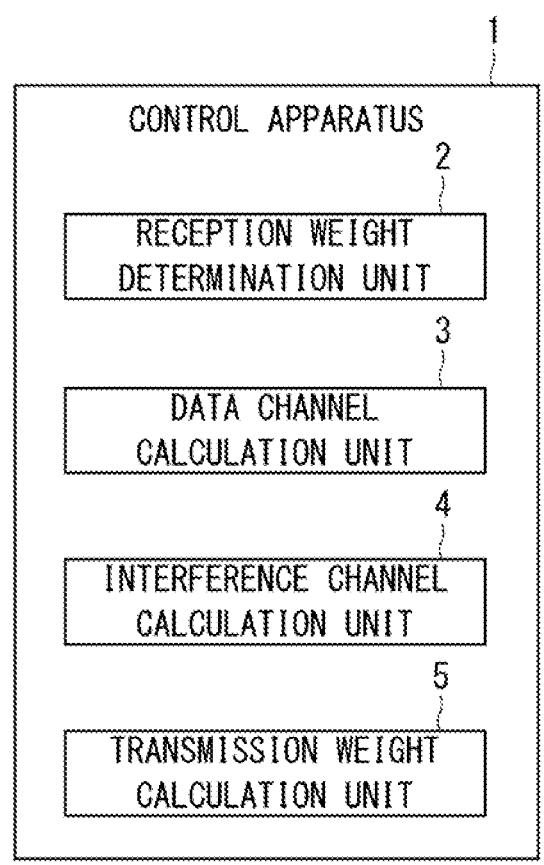
FIG. 1 shows an example of a configuration of a control apparatus according to a first example embodiment.

Example embodiments according to the present disclosure will be described hereinafter with reference to the drawings. Note that the following description and the drawings are omitted and simplified as appropriate for clarifying the explanation. Further, the same elements are denoted by the same reference numerals throughout the drawings, and redundant descriptions thereof are omitted as required.

First Example Embodiment

A control apparatus 1 according to a first example embodiment will be described with reference to FIG. 1. FIG. 1 shows an example of a configuration of a control apparatus according to the first example embodiment. The control apparatus 1 connects to a first radio apparatus (not shown) and a second radio apparatus (not shown), and controls these first and second radio apparatuses. The first radio apparatus performs radio communication with a first radio terminal (not shown). The second radio apparatus performs radio communication with a second radio terminal (not shown). Each of the first and second radio apparatuses may also be referred to as a transmission/reception point that transmits and receives radio signals. The control apparatus 1, and the first and second radio apparatuses may constitute a radio base station in a radio communication system. Note that the control apparatus 1 may be configured to connect to other radio apparatus in addition to the first and second radio apparatuses. Further, each of the first and second radio apparatuses may be configured to communicate with a plurality of radio terminals.

The control apparatus 1 includes a reception weight determination unit 2, a data channel calculation unit 3, an interference channel calculation unit 4, and a transmission weight calculation unit 5.

The reception weight determination unit 2 calculates a reception weight matrix corresponding to each of data signals transmitted from the radio apparatus to the radio terminal by using a channel matrix based on channel responses between the radio apparatus and the radio terminal.

Note that a channel matrix based on channel responses between the first radio apparatus and the first radio terminal is referred to as a first channel matrix. A channel matrix based on channel responses between the second radio apparatus and the second radio terminal is referred to as a second channel matrix. A reception weight matrix corresponding to a data signal of the first radio terminal is referred to as a first reception weight matrix. A reception weight matrix corresponding to a data signal of the second radio terminal is referred to as a second reception weight matrix. The reception weight determination unit 2 determines the first and second reception weight matrixes by using the first and second channel matrixes.

The data channel calculation unit 3 calculates a data channel matrix corresponding to a first data signal based on the first channel matrix and the first reception weight matrix determined by the reception weight determination unit 2. The data channel calculation unit 3 calculates a data channel matrix corresponding to a data signal transmitted from the first radio apparatus to the first radio terminal by multiplying the first channel matrix by the first reception weight matrix determined by the reception weight determination unit 2.

The interference channel calculation unit 4 calculates an interference channel matrix corresponding to interference to the second radio terminal caused by the first radio apparatus by using a third channel matrix, which is a channel matrix based on channel responses between the first radio apparatus and the second radio terminal, and the second reception weight matrix. The interference channel calculation unit 4 calculates an interference channel matrix corresponding to interference to radio terminals other than the radio terminal with which the radio apparatus is communicating caused by the radio apparatus by multiplying the channel matrix by the reception weight matrix determined by the reception weight determination unit 2.

Note that the second reception weight matrix determined by the reception weight determination unit 2 is a matrix having a number of dimensions corresponding to the number of antennas of the second radio terminal and the number of data signals transmitted from the second radio apparatus to the second radio terminal. Further, the third channel matrix is a matrix based on channel responses between the first radio apparatus and the second radio terminal, and is a matrix having a number of dimensions corresponding to the number of antennas of the first radio apparatus and the number of antennas of the second radio terminal. The interference channel calculation unit 4 calculates a matrix having a number of dimensions corresponding to the number of interference signals that are caused by the first radio apparatus and affect the second radio terminal by multiplying the third channel matrix by the second reception weight matrix, and uses the calculated matrix as the interference channel matrix. That is, the interference channel calculation unit 4 calculates an interference channel matrix in which the number of channels for which interference should be suppressed for each radio terminal is changed from the number of antennas of the radio terminal to the number of data signals by multiplying the third channel matrix by the second reception weight matrix.

The transmission weight calculation unit 5 calculates, based on the data channel matrix and the interference channel matrix, a transmission weight matrix for transmitting a first data signal from the first radio apparatus to the first radio communication apparatus while suppressing interference to the second radio communication terminal. That is, the transmission weight calculation unit 5 calculates, by using the calculated data channel matrix and the calculated interference channel matrix, a transmission weight matrix for transmitting a data signal from the radio apparatus to the radio communication apparatus while suppressing interference to radio terminals other than the intended radio terminal.

As described above, the control apparatus 1 calculates a reception weight matrix corresponding to a data signal of each radio terminal. The control apparatus 1 calculates a data channel matrix corresponding to a data signal transmitted from the radio apparatus to the radio terminal by multiplying a channel matrix by a reception weight matrix. The control apparatus 1 calculates an interference channel matrix corresponding to interference to radio terminals other than the intended radio terminal caused by the radio apparatus by multiplying a channel matrix by a reception weight matrix. The control apparatus 1 calculates, by using a data channel matrix and an interference channel matrix, a transmission weight matrix for transmitting a data signal from the radio apparatus to the radio terminal with which the radio apparatus is communicating while suppressing interference to radio terminals other than the radio terminal with which the radio apparatus is communicating.

Since the control apparatus 1 calculates the interference channel matrix by using the reception weight matrix corresponding to a data signal, it can accurately calculate interference to the data signal. Further, by using the interference channel matrix for the suppression of interference, the control apparatus 1 can change the number of channels for which interference should be suppressed for each radio terminal from the number of antennas of the radio terminal to the number of data signals. Therefore, when the number of data signals is less than the number of antennas of the radio terminal, the control apparatus 1 can reduce the number of channels for which interference should be suppressed while maintaining the interference suppression performance. As a result, the control apparatus 1 can allocate channels, which have become available because of the above-described reduction in the number of channels, for data signals. That is, by using the control apparatus 1, it is possible to reduce the number of channels for which interference should be suppressed and increase the number of data signals. Therefore, according to the control apparatus 1 in accordance with the first example embodiment, it is possible to increase the number of data signals and thereby to improve the throughput.

Second Example Embodiment

Next, a second example embodiment will be described. The second example embodiment is an example embodiment that is equivalent to the first example embodiment but will be described in a more detailed manner.

<Example of Configuration of Radio Communication System>

Figure 2:
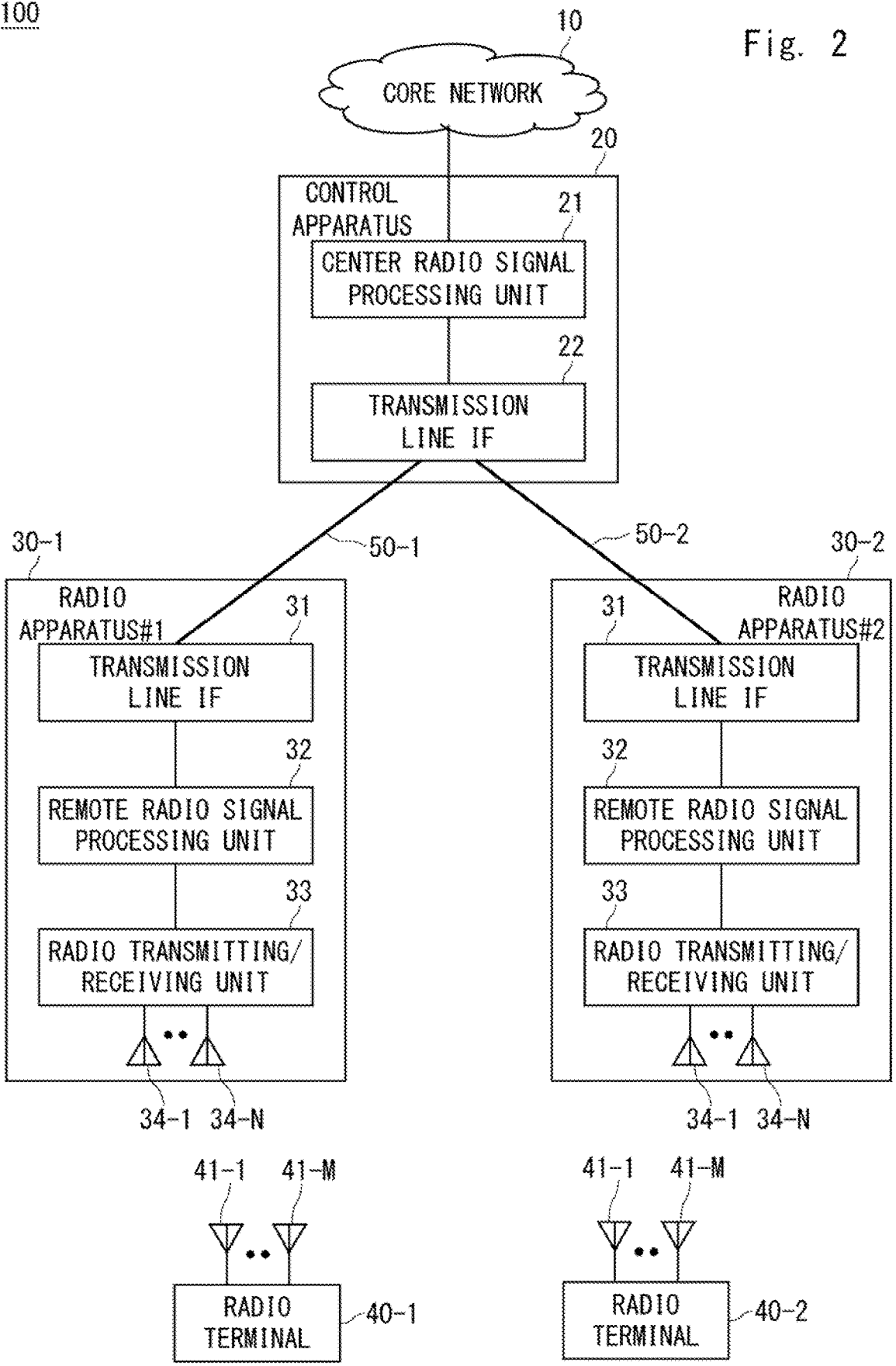
FIG. 2 shows an example of a configuration of a radio communication system according to a second example embodiment.

An example of a configuration of a radio communication system 100 according to the second example embodiment will be described with reference to FIG. 2. FIG. 2 shows an example of a configuration of a radio communication system according to the second example embodiment. As shown in FIG. 2, the radio communication system 100 includes a core network 10, a control apparatus 20, radio apparatuses 30-1 and 30-2, and radio terminals 40-1 and 40-2. Note that although the radio communication system 100 includes two radio apparatuses (the radio apparatuses 30-1 and 30-2) in this example, it may include three or more radio apparatuses. Further, although the radio communication system 100 includes two radio terminals (the radio terminals 40-1 and 40-2) in this example, it may include three or more radio terminals.

The core network 10 is, for example, a network formed by a core network apparatus(es) specified in 3GPP (Third Generation Partnership Project). The core network 10 is connected to the control apparatus 20, and when data is transmitted from a control apparatus other than the control apparatus 20 to the radio terminal 40, the control apparatus 20 receives this data through the core network 10. Note that when data is transmitted from a control apparatus other than the control apparatus 20 to the radio terminal 40, the control apparatus 20 may receive this data by using an interface with the other control apparatus.

The control apparatus 20 corresponds to the control apparatus 1 in the first example embodiment. The control apparatus 20 may be, for example, a CU (Central Unit or Centralized Unit) or the like, or a centralized node in a C-RAN (Centralized Radio Access Network) configuration. The control apparatus 20 connects to and communicates with the radio apparatus 30-1 through a transmission line 50-1. Further, the control apparatus 20 connects to and communicates with the radio apparatus 30-2 through a transmission line 50-2. Each of the transmission lines 50-1 and 50-2 is, for example, a medium used for the transmission of information, such as an optical fiber, a metal cable, or a radio propagation path. Note that, in the following description, when the transmission lines 50-1 and 50-2 do not need to be distinguished from each other, they may be simply referred to as "the transmission line(s) 50".

Each of the radio apparatuses 30-1 and 30-2 may be, for example, an RU (Radio Unit or Remote Unit), a DU (Distributed Unit), or a TRP (Transmission Reception Point), or may be a distributed node in a C-RAN configuration. At least one of the radio apparatuses 30-1 and 30-2 may be disposed physically remotely from the control apparatus 20. The radio apparatuses 30-1 and 30-2 connect to and perform radio communication with the radio terminals 40-1 and 40-2 through radio propagation paths. Note that, in the following description, it is assumed that the radio apparatus 30-1 performs radio communication with the radio terminal 40-1, and the radio apparatus 30-2 performs radio communication with the radio terminal 40-2. Further, the radio apparatus 30-1 may also be referred to as a radio apparatus #1, and the radio apparatus 30-2 may also be referred to as a radio apparatus #2. Further, when the radio apparatuses 30-1 and 30-2 do not need to be distinguished from each other, they may be simply referred to as "the radio apparatus(es) 30".

Each of the radio terminals 40-1 and 40-2 may be, for example, a mobile station, a UE (User Equipment) or a relay apparatus having a relaying function. Each of the radio terminals 40-1 and 40-2 includes antennas 41-1 to 41-M (M is an integer equal to or greater than two), a radio transmitting/receiving unit (not shown), and a radio signal processing unit (not shown). Note that, in the following description, the radio terminal 40-1 may also be referred to as a radio terminal #1, and the radio terminal 40-2 may also be referred to as a radio terminal #2. Further, when the radio terminals 40-1 and 40-2 do not need to be distinguished from each other, they may be simply referred to as "the radio terminal(s) 40". Further, when the antennas 41-1 to 41-M do not need to be distinguished from one another, they may be simply referred to as "the antenna(s) 41".

<Example of Configuration of Control Apparatus>

Next, an example of a configuration of the control apparatus 20 will be described. As shown in FIG. 2, the control apparatus 20 includes a center radio signal processing unit 21 and a transmission line IF (Interface) 22.

The center radio signal processing unit 21 has functions for a part of a PHY (Physical) layer and functions for layers higher than the PHY layer. Note that some of the functions of the center radio signal processing unit 21 may be controlled by another apparatus(es) disposed physically remotely therefrom. Details of the configuration of the center radio signal processing unit 21 will be described later. The transmission line IF 22 communicates with a transmission line IF 31 of the radio apparatus 30 through the transmission line 50.

<Example of Configuration of Radio Apparatus>

Next, an example of a configuration of the radio apparatus 30 will be described. As shown in FIG. 2, the radio apparatus 30 includes a transmission line IF (Interface) 31, a remote radio signal processing unit 32, a radio transmitting/receiving unit 33, and antennas 34-1 to 34-N(N is an integer equal to or greater than two).

The transmission line IF 31 communicates with the transmission line IF 22 of the control apparatus 20 through the transmission line 50.

The remote radio signal processing unit 32 has functions for a part of the PHY layer. The remote radio signal processing unit 32 has, for example, an FFT (Fast Fourier Transform) function, an IFFT (Inverse Fast Fourier Transform) function, a precoding weight multiplying function, and the like.

The radio transmitting/receiving unit 33 converts a baseband signal into an RF (Radio Frequency) signal and converts an RF signal into a baseband signal.

The antennas 34-1 to 34-N transmit an RF signal to the radio terminal 40 and receive an RF signal transmitted from the radio terminal 40. Note that, in the following description, when the antennas 34-1 to 34-N do not need to be distinguished from one another, they may be simply referred to as "the antenna(s) 34".

<Example of Configuration of Center Radio Signal Processing Unit>

Figure 3:
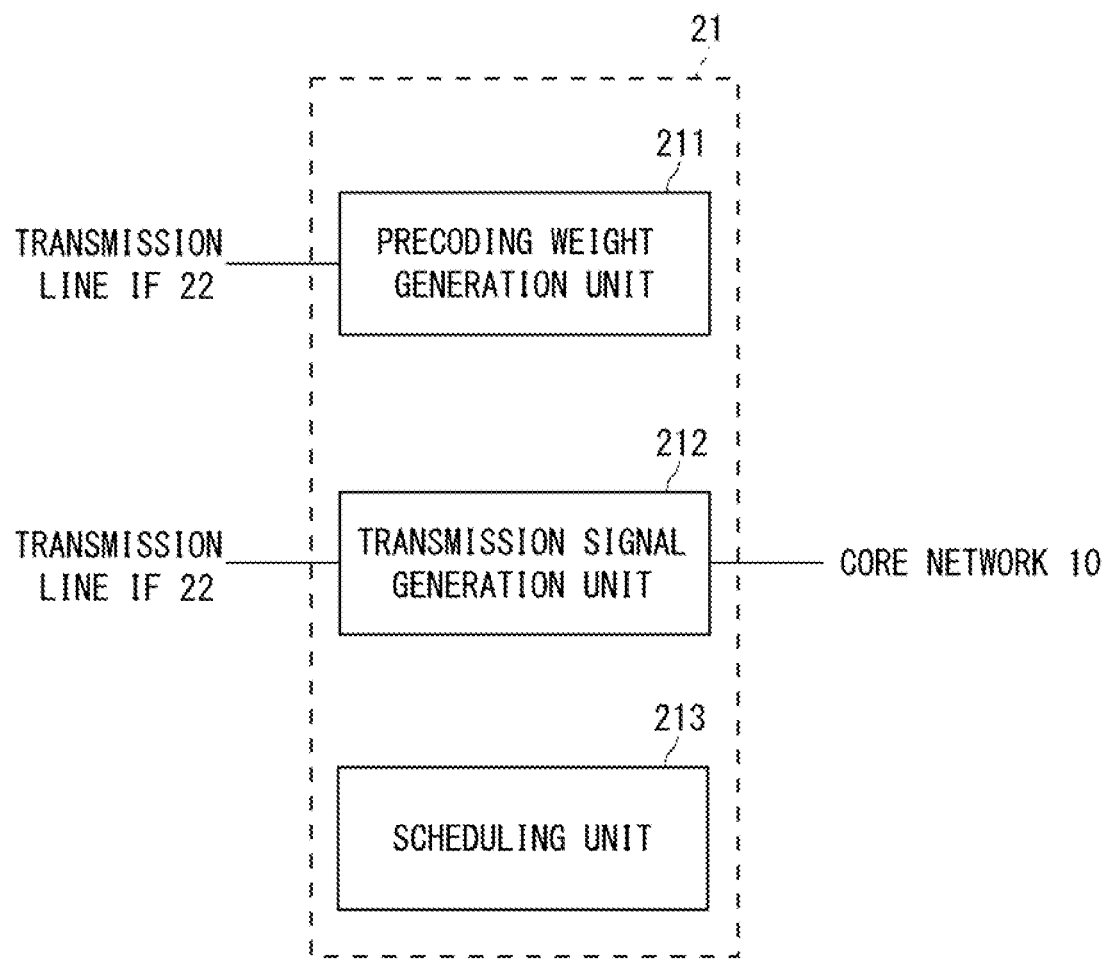
FIG. 3 shows an example of a configuration of a center radio signal processing unit according to the second example embodiment.

Next, details of the configuration of the center radio signal processing unit 21 will be described with reference to FIG. 3. FIG. 3 shows an example of a configuration of the center radio signal processing unit according to the second example embodiment. As shown in FIG. 3, the center radio signal processing unit 21 includes a precoding weight generation unit 211, a transmission signal generation unit 212, and a scheduling unit 213. Note that, in FIG. 3, functional blocks that are not directly related to the present disclosure are omitted.

The precoding weight generation unit 211 receives a reception signal from the radio apparatus 30 through the transmission line IF 22. Further, the precoding weight generation unit 211 receives an estimated value of a channel response between each of the antennas 34 of the radio apparatus 30 and each of the antennas 41 of the radio terminal 40. The precoding weight generation unit 211 generates precoding weights by using the received reception signal or the estimated values of channel responses, and transmits the generated precoding weights to the radio apparatus 30 through the transmission line IF 22.

Note that although this example embodiment is explained on the assumption that the radio apparatus 30 has the function of multiplying the precoding weight received from the precoding weight generation unit 211, the transmission signal generation unit 212 may instead have the function of multiplying the precoding weight. In such a case, the precoding weight generation unit 211 transmits the generated precoding weight to the transmission signal generation unit 212. Details of the configuration of the precoding weight generation unit 211 will be described later.

The transmission signal generation unit 212 generates a signal to be transmitted to the radio terminal 40, and transmits the generated signal to the radio apparatus 30 through the transmission line IF 22. Note that, as described above, the transmission signal generation unit 212 may have the function of multiplying the precoding weight.

The scheduling unit 213 performs scheduling for communication between the radio apparatus 30 and the radio terminal 40. The scheduling unit 213 may receive precoding weights and estimated values of channel responses from the precoding weight generation unit 211, and perform scheduling by using the received precoding weights and the estimated values of the channel responses.

<Example of Configuration of Precoding Weight Generation Unit>

Figure 4:
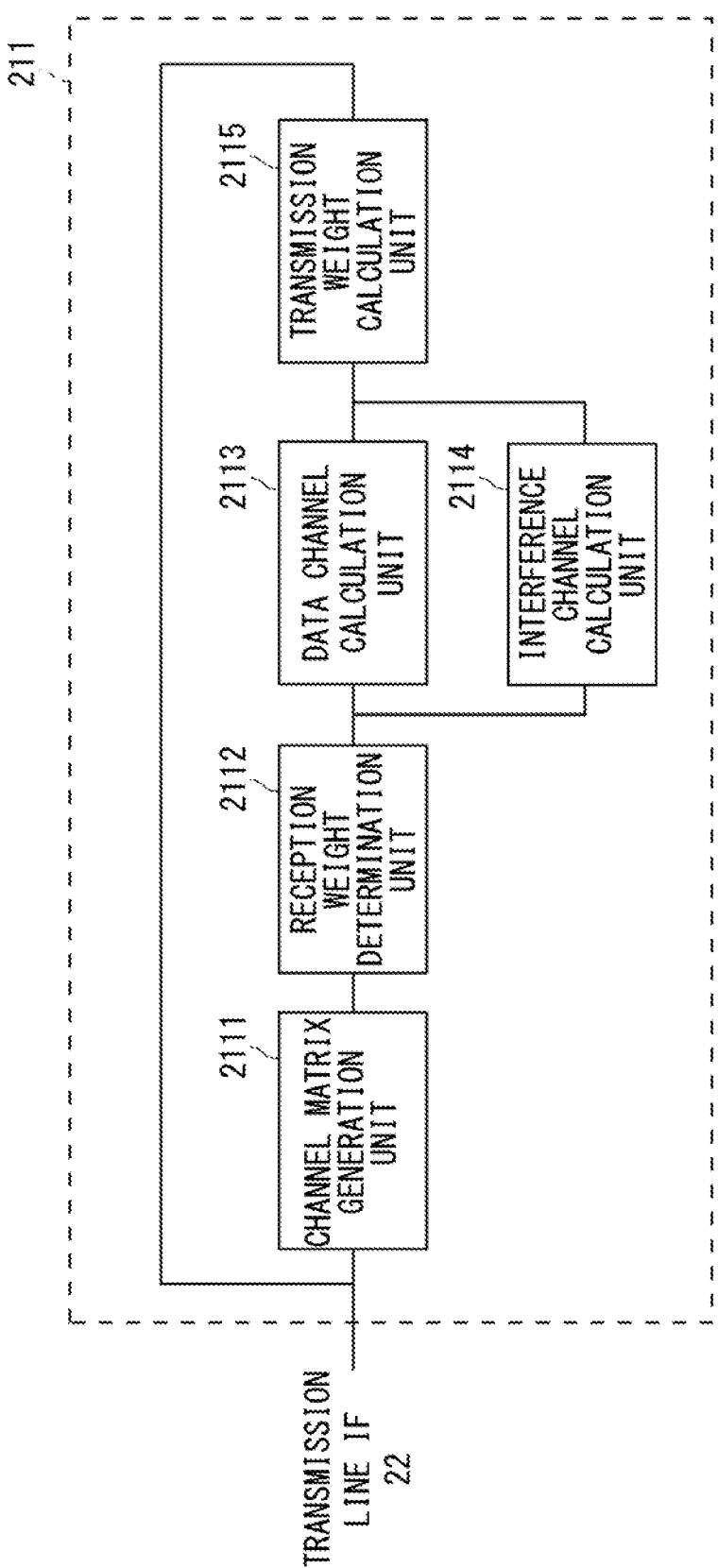
FIG. 4 shows an example of a configuration of a precoding weight generation unit according to the second example embodiment.

Next, details of the configuration of the precoding weight generation unit 211 will be described with reference to FIG. 4. FIG. 4 shows an example of a configuration of a precoding weight generating unit according to the second example embodiment. As shown in FIG. 4, the precoding weight generation unit 211 includes a channel matrix generation unit 2111, a reception weight determination unit 2112, a data channel calculation unit 2113, an interference channel calculation unit 2114, and a transmission weight calculation unit 2115.

The channel matrix generation unit 2111 acquires an estimated value of a channel response between each of the antennas 34-1 to 34-N of the radio apparatus 30 and each of the antennas 41-1 to 41-M of the radio terminal 40, and generates a channel matrix having these estimated values of the channel responses as its respective elements. The channel matrix generation unit 2111 calculates a first channel matrix based on channel responses between the radio apparatus 30-1 and the radio terminal 40-1. The channel matrix generation unit 2111 calculates a second channel matrix based on channel responses between the radio apparatus 30-2 and the radio terminal 40-2. The channel matrix generation unit 2111 calculates a third channel matrix based on channel responses between the radio apparatus 30-1 and the radio terminal 40-2. The channel matrix generation unit 2111 calculates a fourth channel matrix based on channel responses between the radio apparatus 30-2 and the radio terminal 40-1.

The channel matrix generation unit 2111 may acquire estimated values of channel responses by estimating the channel responses by itself. Alternatively, the remote radio signal processing unit 32 of the radio apparatus 30 may estimate channel responses, and the channel matrix generation unit 2111 may acquire the estimated values of the channel responses from the remote radio signal processing unit 32 through the transmission line 50. Alternatively, the remote radio signal processing unit 32 may generate a channel matrix having estimated values of channel responses as its elements, and the channel matrix generation unit 2111 may acquire this channel matrix from the remote radio signal processing unit 32 through the transmission line 50. The channel matrix generation unit 2111 transmits the generated channel matrix or the channel matrix acquired from the remote radio signal processing unit 32 to the reception weight determination unit 2112.

The reception weight determination unit 2112 corresponds to the reception weight determination unit 2 in the first example embodiment. The reception weight determination unit 2112 calculates a reception weight matrix corresponding to a data signal transmitted from the radio apparatus 30 to the radio terminal 40 by using the channel matrix transmitted from the channel matrix generation unit 2111.

Specifically, the reception weight determination unit 2112 calculates a reception weight matrix corresponding to a data signal of the radio terminal 40-1 by using a first channel matrix which is a channel matrix based on channel responses between the radio apparatus 30-1 and the radio terminal 40-1. Further, the reception weight determination unit 2112 calculates a reception weight matrix corresponding to a data signal of the radio terminal 40-2 by using a second channel matrix which is a channel matrix based on channel responses between the radio apparatus 30-2 and the radio terminal 40-2. The reception weight determination unit 2112 transmits the calculated reception weight matrix and the channel matrix to the data channel calculation unit 2113 and the interference channel calculation unit 2114.

The data channel calculation unit 2113 corresponds to the data channel calculation unit 3 in the first example embodiment. The data channel calculation unit 2113 calculates a data channel matrix corresponding to a data signal to be transmitted from the radio apparatus 30-1 to the radio terminal 40-1 and a data signal to be transmitted from the radio apparatus 30-2 to the radio terminal 40-2 by using the channel matrix and the reception weight matrix. The data channel calculation unit 2113 transmits the calculated data channel matrix to the transmission weight calculation unit 2115.

Note that the channel matrix based on channel responses between the radio apparatus 30-1 and the radio terminal 40-1 is the first channel matrix. The channel matrix based on channel responses between the radio apparatus 30-2 and the radio terminal 40-2 is the second channel matrix. The reception weight matrix corresponding to the data signal of the radio terminal 40-1 is referred to as a first reception weight matrix. The reception weight matrix corresponding to the data signal of the radio terminal 40-2 is referred to as a second reception weight matrix. The data channel calculation unit 2113 calculates a data channel matrix corresponding to a data signal transmitted from the radio apparatus 30-1 to the radio terminal 40-1 by using the first channel matrix and the first reception weight matrix. The data channel calculation unit 2113 calculates a data channel matrix corresponding to a data signal transmitted from the radio apparatus 30-2 to the radio terminal 40-2 by using the second channel matrix and the second reception weight matrix.

The interference channel calculation unit 2114 corresponds to the interference channel calculation unit 4 in the first example embodiment. The interference channel calculation unit 2114 calculates an interference channel matrix corresponding to interference to the radio terminal 40-2 caused by the radio apparatus 30-1 and interference to the radio terminal 40-1 caused by the radio apparatus 30-2 by using the channel matrix and the reception weight matrix transmitted from the reception weight determination unit 2112. The interference channel calculation unit 2114 transmits the calculated interference channel matrix to the transmission weight calculation unit 2115.

Note that the channel matrix based on channel responses between the radio apparatus 30-1 and the radio terminal 40-2 is the third channel matrix. The channel matrix based on channel responses between the radio apparatus 30-2 and the radio terminal 40-1 is the fourth channel matrix. The interference channel calculation unit 2114 calculates an interference channel matrix corresponding to interference to the radio terminal 40-2 caused by the radio apparatus 30-1 by using the third channel matrix and the second reception weight matrix. Further, the interference channel calculation unit 2114 calculates an interference channel matrix corresponding to interference to the radio terminal 40-1 caused by the radio apparatus 30-2 by using the fourth channel matrix and the first reception weight matrix.

The transmission weight calculation unit 2115 corresponds to the transmission weight calculation unit 5 in the first example embodiment. The transmission weight calculation unit 2115 calculates, by using the data channel matrix and the interference channel matrix, a transmission weight matrix that is used when each of the radio apparatuses 30-1 and 30-2 transmits a data signal. The transmission weight calculation unit 2115 calculates, based on the data channel matrix and the interference channel matrix, a transmission weight matrix for transmitting a data signal from the radio apparatus 30-1 to the radio terminal 40-1 while suppressing interference to the radio terminal 40-2. The transmission weight calculation unit 2115 calculates, based on the data channel matrix and the interference channel matrix, a transmission weight matrix for transmitting a data signal from the radio apparatus 30-2 to the radio terminal 40-2 while suppressing interference to the radio terminal 40-1. The transmission weight calculation unit 2115 transmits the calculated transmission weight matrix as precoding weights to the corresponding radio apparatus 30 through the transmission line IF 22.

<Example of Operation of Precoding Weight Generation Unit>

Figure 5:
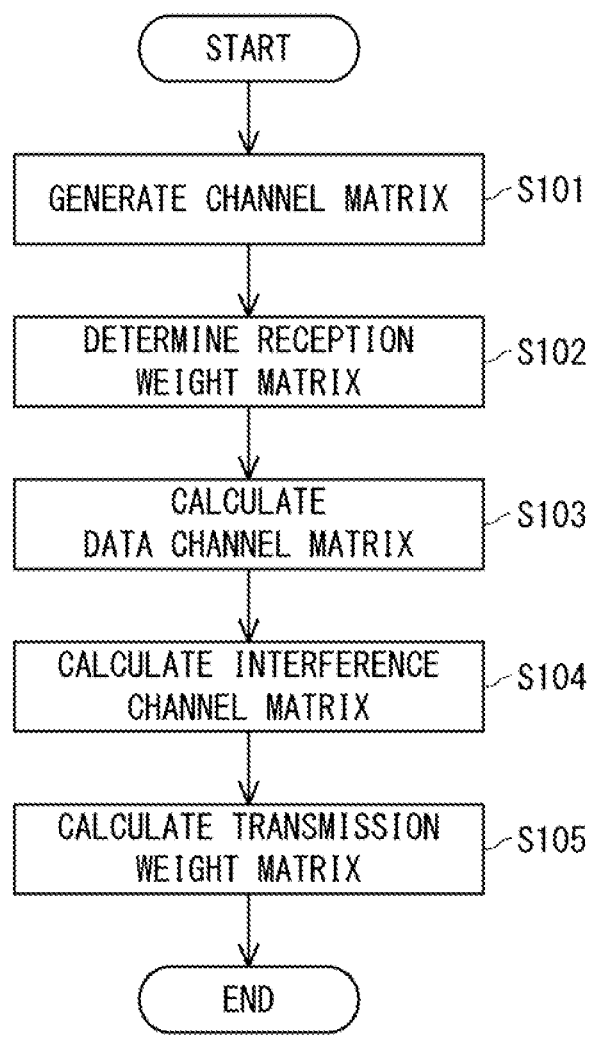
FIG. 5 is a flowchart showing an example of operations performed by the precoding weight generation unit according to the second example embodiment.

Next, an example of operations performed by the precoding weight generation unit 211 will be described with reference to FIG. 5. FIG. 5 is a flowchart showing an example of operations performed by a precoding weight generation unit according to the second example embodiment.

Firstly, the channel matrix generation unit 2111 generates a channel matrix based on an estimated value of a channel response between each of the antennas 34-1 to 34-N of the radio apparatus 30 and each of the antennas 41-1 to 41-M of the radio terminal 40 (step S101). The channel matrix generation unit 2111 acquires an estimated value of a channel response between each of the antennas 34-1 to 34-N of the radio apparatus 30-$b$ ($b$ is 1 or 2) and each of the antennas 41-1 to 41-M of the radio terminal 40-$k$ ($k$ is 1 or 2). The channel matrix generation unit 2111 generates an (M×N)-dimensional channel matrix $H_{b,k}$ having estimated values of channel responses as its elements.

Next, the reception weight determination unit 2112 calculates a reception weight matrix corresponding to a data signal transmitted from the radio apparatus 30 to the radio terminal 40 by using the generated channel matrix (step S102).

A method for determining a reception weight matrix performed by the reception weight determination unit 2112 will be described hereinafter. In the following description, the number of data signals transmitted from the radio apparatus 30-$b$ to the radio terminal 40-$k$ is represented by $D_k$. Note that $D_k$ is no less than one and no greater than M. Further, an (M×$D_k$)-dimensional reception weight matrix corresponding to the radio terminal 40-$k$ is represented by $U_k$.

As an example of the method for determining a reception weight matrix, there is a method in which singular value decomposition for a channel matrix is used. The reception weight determination unit 2112 selects $D_k$ M-dimensional left singular vectors (i.e., $D_k$ pieces of M-dimensional left singular vectors) having large singular values from among M-dimensional left singular vectors calculated by singular value decomposition of an (M×N)-dimensional channel matrix. The reception weight determination unit 2112 determines a reception weight matrix $U_k$ by using the selected $D_k$ M-dimensional left singular vectors as respective column vectors of the reception weight matrix $U_k$.

As a second example of the method for determining a reception weight matrix, there is a method in which eigenvalue decomposition for a correlation matrix of a channel matrix is used. The reception weight determination unit 2112 selects $D_k$ M-dimensional eigenvectors (i.e., $D_k$ pieces of M-dimensional eigenvectors) having large eigenvalues from among M-dimensional eigenvectors calculated by eigenvalue decomposition of an (M×N)-dimensional correlation matrix which is the product of a channel matrix and a Hermite transposition of the channel matrix. The reception weight determination unit 2112 determines a reception weight matrix $U_k$ by using the selected $D_k$ M-dimensional eigenvectors as respective column vectors of the reception weight matrix $U_k$.

As a third example of the method for determining a reception weight matrix, there is a method in which weight vectors are selected from among a plurality of reception weight vectors prepared in advance. In other words, in the third example of the method determining a reception weight matrix, the reception weight matrix is configured by the selected weight vectors from among the plurality of reception weight vectors prepared in advance. The reception weight determination unit 2112 multiplies an (M×N)-dimensional channel matrix by each of a plurality of M-dimensional reception weight vectors prepressed in advance. The reception weight determination unit 2112 determines a reception weight matrix $U_k$ by using $D_k$ M-dimensional weight vectors (i.e., $D_k$ pieces of M-dimensional weight vectors) having large norms among the calculated N-dimensional weight vectors as respective column vectors of the reception weight matrix $U_k$.

As a fourth example of the method for determining a reception weight matrix, there is a method in which the reception weight matrix is calculated by using transmission weight vectors prepared in advance. The reception weight determination unit 2112 multiplies an (M×N)-dimensional channel matrix by each of N-dimensional transmission weight vectors prepressed in advance. Note that the N-dimensional transmission weight vectors prepared in advance are temporary transmission weight vectors different from the transmission weight matrix calculated by the transmission weight calculation unit 2115. The reception weight determination unit 2112 selects $D_k$ M-dimensional vectors (i.e., $D_k$ pieces of M-dimensional vectors) having large norms from among the calculated M-dimensional vectors and determines the reception weight matrix $U_k$ by using the selected M-dimensional vectors as respective column vectors of the reception weight matrix $U_k$. Note that the reception weight determination unit 2112 may normalize each column vector of the reception weight matrix so that the norm of each column vector of the reception weight matrix becomes one.

The explanation will be continued by referring to FIG. 5 again. The data channel calculation unit 2113 calculates a data channel matrix corresponding to a data signal transmitted from the radio apparatus 30-1 to the radio terminal 40-1 and a data signal transmitted from the radio apparatus 30-2 to the radio terminal 40-2 by using the channel matrix and the reception weight matrix (step S103).

The data channel matrix is calculated by the product of the Hermitian transpose of the channel matrix and the reception weight matrix. An (N×$D_k$)-dimensional data channel matrix corresponding to a data signal transmitted from the radio apparatus 30-$b$ ($b$ is 1 or 2) to the radio terminal 40-$k$ ($k$ is 1 or 2) is represented by $F_{b,k}$. Note that the data channel matrix $F_{b,k}$ is calculated by the below-shown Expression (1). The data channel calculation unit 2113 calculates the data channel matrix $F_{b,k}$ by using the channel matrix $H_{b,k}$, the reception weight matrix $U_k$, and the Expression (1).

[Expression 1]

$$F_{b,k} = H_{b,k}^{H} U_k \quad (1)$$

In the expression, H represents a Hermitian transposition.

Next, the interference channel calculation unit 2114 calculates an interference channel matrix corresponding to interference to the radio terminal 40-2 caused by the radio apparatus 30-1 and interference to the radio terminal 40-1 caused by the radio apparatus 30-2 by using the channel matrix and the reception weight matrix (step S104).

The interference channel matrix is calculated by the product of the Hermitian transpose of the channel matrix and the reception weight matrix. Here, an $(N \times D_j)$-dimensional interference channel matrix corresponding to interference to a data signal of the radio terminal 40-$j$ ($j$ is 1 or 2) caused by the radio apparatus 30-$b$ ($b$ is 1 or 2) is represented by $G_{b,j}$. Note that the interference channel matrix $G_{b,j}$ is calculated by the below-shown Expression (2). The interference channel calculation unit 2114 calculates the data channel matrix $G_{b,j}$ by using the channel matrix $H_{b,k}$, the reception weight matrix $U_j$, and the Expression (2).

[Expression 2]

$$G_{b,j} = H_{b,j}{}^H U_j \qquad (2)$$

Note that the interference channel calculation unit 2114 may reduce the number of elements of the interference channel matrix based on the magnitude of the interference. For example, the interference channel calculation unit 2114 may reduce the number of columns of the interference channel matrix $G_{b,j}$ to a number smaller than $D_j$ by calculating the norm of each column vector of the matrix $G_{b,j}$ and eliminating column vectors having small norms from the matrix $G_{b,j}$.

Lastly, the transmission weight calculation unit 2115 calculates a transmission weight matrix that is used when each of the radio apparatuses 30-1 and 30-2 transmits a data signal by using the data channel matrix and the interference channel matrix (step S105). The transmission weight calculation unit 2115 transmits the calculated transmission weight matrix as precoding weights to the corresponding radio apparatus 30 through the transmission line IF 22.

A method for calculating a transmission weight matrix performed by the transmission weight calculation unit 2115 will be described hereinafter. Although a method for calculating a transmission weight matrix for the radio apparatus 30-1 will be described as an example in the following description, a similar calculation method is applied to the radio apparatus 30-2.

The transmission weight calculation unit 2115 generates an $(N \times (D_1 + D_2))$-dimensional matrix $A_1$ having, as its elements, a data channel matrix for the radio terminal 40-1 and an interference channel matrix for the radio terminal 40-2. Note that the matrix $A_1$ can be expressed as the below-shown Expression (3).

[Expression 3]

$$A_1 = (F_{1,1} G_{1,2}) \qquad (3)$$

Next, the transmission weight calculation unit 2115 generates the ZF (Zero Forcing) method based $(N \times (D_1 + D_2))$-dimensional weight matrix $W_1$ as shown in the below-shown Expression (4) by using the $(N \times (D_1 + D_2))$-dimensional matrix $A_1$.

[Expression 4]

$$W_1 = A_1 (A_1{}^H A_1)^{-1} \qquad (4)$$

Note that, although the transmission weight calculation unit 2115 uses the ZF method to generate the weight matrix in this example embodiment, it may use an MMSE (Minimum Mean Square Error) method, an SLNR (Signal-to-Leakage-plus-Noise Ratio) method, a block diagonalization method, or the like.

The transmission weight calculation unit 2115 transmits the first to $D_1$-th column vectors of the $(N \times (D_1 + D_2))$-dimensional weight matrix $W_1$ to the radio apparatus 30-1 as an $(N \times D_1)$-dimensional precoding weight matrix for the radio terminal 40-1. Note that the transmission weight calculation unit 2115 may normalize each column vector of the precoding weight matrix so that the norm of each column vector of the precoding weight matrix becomes one.

As described above, the channel matrix generation unit 2111 generates a channel matrix between the radio apparatus 30 and the radio terminal 40. The reception weight determination unit 2112 calculates a reception weight matrix corresponding to data signals of the radio terminals 40-1 and 40-2. The data channel calculation unit 2113 calculates a data channel matrix corresponding to a data signal transmitted from the radio apparatus 30-1 to the radio terminal 40-1 and a data signal transmitted from the radio apparatus 30-2 to the radio terminal 40-2 by using the channel matrix and the reception weight matrix. The interference channel calculation unit 2114 calculates an interference channel matrix corresponding to interference to the radio terminal 40-2 caused by the radio apparatus 30-1 and interference to the radio terminal 40-1 caused by the radio apparatus 30-2 by using the channel matrix and the reception weight matrix. The transmission weight calculation unit 2115 calculates, by using the data channel matrix and the interference channel matrix, a transmission weight matrix that is used when each of the radio apparatuses 30-1 and 30-2 transmits a data signal.

Since the interference channel calculation unit 2114 calculates the interference channel matrix by using the reception weight matrix corresponding to a data signal, it can accurately calculate interference to the data signal. Further, by using the interference channel matrix for the suppression of interference, the transmission weight calculation unit 2115 changes the number of channels for which interference should be suppressed for each radio terminal from the number of antennas of the radio terminal to the number of data signals. Specifically, the interference channel calculation unit 2114 calculates an $(N \times D_j)$-dimensional interference channel matrix by multiplying an $(M \times N)$-dimensional channel matrix $H_{b,j}$ by an $(N \times D_j)$-dimensional reception weight matrix $U_j$ as shown in the above-shown Expression (2). Since the transmission weight calculation unit 2115 uses the $(N \times D_j)$-dimensional interference channel matrix for the suppression of interference, it can change the number of channels for which interference should be suppressed for each radio terminal from the number of antennas of the radio terminal to the number of data signals. Therefore, when the number of data signals is less than the number of antennas of the radio terminal, the control apparatus 20 can reduce the number of channels for which interference should be suppressed while maintaining the interference suppression performance. That is, by using the control apparatus 20, it is possible to reduce the number of channels for which interference should be suppressed and increase the number of data signals. Therefore, according to the control apparatus 20 in accordance with the second example embodiment, it is possible to increase the number of data signals and thereby to improve the throughput.

Other Example Embodiments

Figure 6:
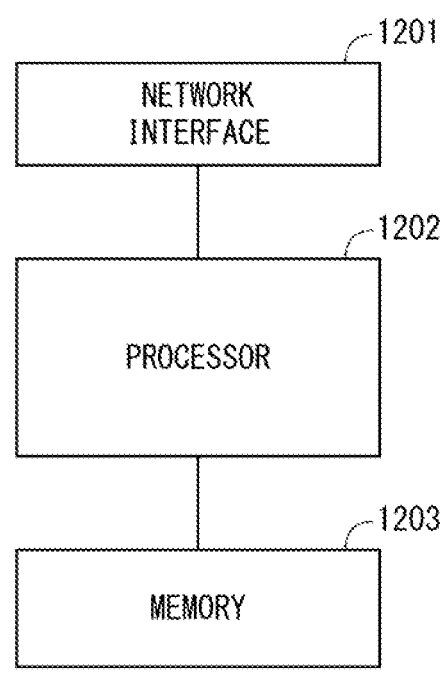
FIG. 6 is a block diagram showing an example of a hardware configuration of a computer (an information processing apparatus) capable of implementing a control apparatus or the like according to each example embodiment in accordance with the present disclosure.

The control apparatuses 1 and 20 (hereinafter these apparatuses are referred to as the control apparatus 1 and the like) according to the above example embodiments may include the following hardware configuration. FIG. 6 is a block diagram illustrating a hardware configuration of a computer (information processing apparatus) capable of achieving the control apparatus and the like according to each of the example embodiments of the present disclosure.

With reference to FIG. 6, the control apparatus 1 and the like include a network interface 1201, a processor 1202, and a memory 1203. The network interface 1201 is used to communicate with other communication apparatuses such as the radio apparatuses 30-1 and 30-2 that are included in the radio communication system.

The processor 1202 executes the processing of the control apparatus 1 and the like described with reference to the flowcharts in the aforementioned embodiments by loading software (computer program) from the memory 1203 and executing the loaded software. The processor 1202 may be, for example, a microprocessor, a Micro Processing Unit (MPU), or a Central Processing Unit (CPU). The processor 1202 may include a plurality of processors.

The memory 1203 is formed of a combination of a volatile memory and a nonvolatile memory. The memory 1203 may include a storage located apart from the processor 1202. In this case, the processor 1202 may access the memory 1203 via an Input/Output (I/O) interface (not shown).

In the example shown in FIG. 6, the memory 1203 is used to store software modules. The processor 1202 is able to achieve the operations of the control apparatus 1 and the like described in the aforementioned embodiments by loading these software modules from the memory 1203 and executing processing in accordance with the instruction by the above software modules.

As described above with reference to FIG. 6, each of the processors that the control apparatus 1 and the like include executes one or a plurality of programs including instructions for causing a computer to execute an algorithm described with reference to the drawings.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT (internet of things) devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follows software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 1

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and example embodiments described in the present document. Needless to say, these technical ideas and embodiments are not limited to the above-described UE and various modifications can be made thereto.

Note that the present disclosure is not limited to the above-described embodiments and can be modified as appropriate without departing from the spirit and scope of the present disclosure. Further, the present disclosure may be implemented by combining the above-described embodiments with one another.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

According to the present disclosure, it is possible to provide a control apparatus, a radio communication method, and a radio communication program capable of improving throughput.

What is claimed is:

1. A control apparatus configured to connect to a first radio apparatus that communicates with a first radio terminal and a second radio apparatus that communicates with a second radio terminal, wherein
the control apparatus comprises:
at least one memory; and
at least one processor connected to the at least one memory, and
the at least one processor is configured to:
determine a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;
calculate a data channel matrix corresponding to a data signal transmitted from the first radio apparatus to the first radio terminal based on the first channel matrix and the first reception weight matrix;
calculate an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and calculate a transmission weight matrix based on the data channel matrix and the interference channel matrix, the transmission weight matrix being a weight matrix for transmitting a data signal from the first radio apparatus to the first radio terminal while suppressing the interference.

2. The control apparatus according to claim 1, wherein the at least one processor is configured to determine the first reception weight matrix and the second reception weight matrix by performing singular value decomposition for the first channel matrix and the second channel matrix, respectively.

3. The control apparatus according to claim 1, wherein the at least one processor is configured to determine the first reception weight matrix and the second reception weight matrix by performing eigen-value decomposition for a correlation matrix of the first channel matrix and a correlation matrix of the second channel matrix, respectively.

4. The control apparatus according to claim 1, wherein the at least one processor is configured to determine the first reception weight matrix and second reception weight matrix based on at least one reception weight vector prepared in advance.

5. The control apparatus according to claim 1, wherein the at least one processor is configured to calculate the first reception weight matrix and the second reception weight matrix based on at least one transmission weight vector prepared in advance.

6. The control apparatus according to claim 1, wherein the at least one processor is configured to reduce the number of elements of the interference channel matrix based on a magnitude of the interference.

7. A radio communication method performed by a control apparatus configured to connect to a first radio apparatus that communicates with a first radio terminal and a second radio apparatus that communicates with a second radio terminal, the radio communication method comprising:

determining a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;

calculating a data channel matrix corresponding to a data signal transmitted from the first radio apparatus to the first radio terminal based on the first channel matrix and the first reception weight matrix;

calculating an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and calculating a transmission weight matrix based on the data channel matrix and the interference channel matrix, the transmission weight matrix being a weight matrix for transmitting a data signal from the first radio apparatus to the first radio terminal while suppressing the interference.

8. A non-transitory computer readable medium storing a radio communication program adapted to be executed by a control apparatus configured to connect to a first radio apparatus that communicates with a first radio terminal and a second radio apparatus that communicates with a second radio terminal, the radio communication program being adapted to cause the control apparatus to perform processes comprising:

determining a first reception weight matrix and a second reception weight matrix corresponding to data signals of the first radio terminal and the second radio terminal, respectively, by using a first channel matrix and a second channel matrix, the first channel matrix being a channel matrix based on channel responses between the first radio apparatus and the first radio terminal, and the second channel matrix being a channel matrix based on channel responses between the second radio apparatus and the second radio terminal;

calculating a data channel matrix corresponding to a data signal transmitted from the first radio apparatus to the first radio terminal based on the first channel matrix and the first reception weight matrix;

calculating an interference channel matrix corresponding to interference to the second radio terminal caused by the first radio apparatus by using a third channel matrix and the second reception weight matrix, the third channel matrix being a channel matrix based on channel responses between the first radio apparatus and the second radio terminal; and calculating a transmission weight matrix based on the data channel matrix and the interference channel matrix, the transmission weight matrix being a weight matrix for transmitting a data signal from the first radio apparatus to the first radio terminal while suppressing the interference.

* * * * *